United States Patent
Onimatsu et al.

(10) Patent No.: US 10,864,694 B2
(45) Date of Patent: Dec. 15, 2020

(54) BEAD APEX RUBBER-FORMING METHOD, AND BEAD APEX RUBBER-FORMING DEVICE

(71) Applicants: SUMITOMO RUBBER INDUSTRIES, LTD., Kobe (JP); NAKATA ENGINEERING CO., LTD., Kobe (JP)

(72) Inventors: Hiroyuki Onimatsu, Kobe (JP); Naoyasu Nakao, Kobe (JP); Hiroyuki Takahashi, Kobe (JP)

(73) Assignees: SUMITOMO RUBBER INDUSTRIES, LTD., Kobe (JP); NAKATA ENGINEERING CO., LTD., Nishi-Ku (JP)

(*) Notice: Subject to any disclaimer, the term of this patent is extended or adjusted under 35 U.S.C. 154(b) by 365 days.

(21) Appl. No.: 15/896,992

(22) Filed: Feb. 14, 2018

(65) Prior Publication Data

US 2018/0311920 A1 Nov. 1, 2018

Related U.S. Application Data

(62) Division of application No. 14/395,769, filed as application No. PCT/JP2013/060616 on Apr. 8, 2013, now Pat. No. 9,944,035.

(30) Foreign Application Priority Data

May 16, 2012 (JP) ................................ 2012-112679

(51) Int. Cl.
  B29D 30/48 (2006.01)
  B29C 48/30 (2019.01)
  (Continued)

(52) U.S. Cl.
  CPC .............. B29D 30/48 (2013.01); B29C 48/30 (2019.02); B29C 48/37 (2019.02); B29C 48/395 (2019.02);
  (Continued)

(58) Field of Classification Search
  CPC ................ B29D 30/0681; B29D 30/48; B29D 2030/481; B29D 2030/482;
  (Continued)

(56) References Cited

U.S. PATENT DOCUMENTS 3,689,612 A 9/1972 Taga
6,238,079 B1 5/2001 Watada et al.
(Continued)

FOREIGN PATENT DOCUMENTS

JP 52071580 A * 6/1977 ............. B29D 30/48
JP 6-297603 A 10/1994
(Continued)

OTHER PUBLICATIONS

Amano Itaru, JP-52071580-A, machine translation. (Year: 1977).*
(Continued)

*Primary Examiner* — Robert C Dye
*Assistant Examiner* — Sedef E Paquette
(74) *Attorney, Agent, or Firm* — Birch, Stewart, Kolasch & Birch, LLP (57) ABSTRACT

The present invention forms bead apex rubber with good precision on the outer circumferential surface of the bead core. A molding process, in which unvulcanized rubber is made to flow into a bead apex molding chamber that is surrounded by surfaces that include the outer circumferential surface of a circular bead core and the bead apex rubber is formed directly on the outer circumferential surface of the bead core that is rotating around the core axis, is provided. The molding process comprises: a tip forming step that
(Continued)

forms the leading end of the bead apex rubber; a middle section forming step that sequentially forms the bead apex rubber to be continuous with the leading end; and a joining step to join the back end and the leading end of the bead apex rubber by inflowing the unvulcanized rubber therebetween.

4 Claims, 12 Drawing Sheets

(51) Int. Cl.
*B29C 48/37* (2019.01)
*B29C 48/92* (2019.01)
*B29C 48/395* (2019.01)
*B29D 30/06* (2006.01)
*B29K 21/00* (2006.01)
*B29K 105/24* (2006.01)

(52) U.S. Cl.
CPC .......... *B29C 48/92* (2019.02); *B29D 30/0681* (2013.01); *B29D 2030/482* (2013.01); *B29D 2030/487* (2013.01); *B29K 2021/00* (2013.01); *B29K 2105/246* (2013.01)

(58) Field of Classification Search
CPC ... B29D 2030/487; B29C 48/30; B29C 48/37; B29C 48/395; B29C 48/92; B29K 2021/00; B29K 2105/246
USPC ........................................................ 156/136
See application file for complete search history.

(56) References Cited

U.S. PATENT DOCUMENTS

| 7,481,638 | B1 | 1/2009 | Burg |
| 2009/0266474 | A1 | 10/2009 | Matsuyama et al. |
| 2009/0274786 | A1 | 11/2009 | Ougier et al. |

FOREIGN PATENT DOCUMENTS

| JP | 07-156193 | | 6/1995 |
| JP | 07-205333 | | 8/1995 |
| JP | 7-205333 | A | 8/1995 |
| JP | 10-291261 | A | 11/1998 |
| JP | 2002-1792 | A | 1/2002 |
| JP | 2004-202960 | A | 7/2004 |
| JP | 2006-272582 | A | 10/2006 |
| JP | 2007-223198 | A | 9/2007 |
| JP | 2009-113493 | A | 5/2009 |
| JP | 2011-173369 | A | 9/2011 |
| WO | WO 2008/010293 | A1 | 1/2008 |
| WO | WO 2011/152107 | A1 | 12/2011 |

OTHER PUBLICATIONS

Shuichi Nakada, JP-07156193-A, machine translation. (Year: 1995).*
International Search Report, issued in PCT/JP2013/060616, dated Jul. 2, 2013.
English language title of JP 52-71580 (original document dated Jun. 1977).
English language translation of JP 52-071580 (original document dated Jun. 1977).
Machine generated English language translation of JP 07-156193 (original document dated Jun. 1995).
Machine generated English language translation of JP 07-205333 (orginal document dated Aug. 1995).
Machine generated English language translation of JP 2011-173369 (original document dated Sep. 2011).
Search Report dated Dec. 14, 2015 for European Application No. 13790894.3-1706.

* cited by examiner

--PRIOR ART--

BEAD APEX RUBBER-FORMING METHOD, AND BEAD APEX RUBBER-FORMING DEVICE

CROSS-REFERENCE TO RELATED APPLICATIONS

This application is a Divisional of copending application Ser. No. 14/395,769, filed Oct. 20, 2014, which is the National Phase under 35 U.S.C. § 371 of International Application No. PCT/JP2013/060616, filed Apr. 8, 2013, which claims the benefit under 35 U.S.C. § 119(a) to Patent Application No. 2012-112679, filed in Japan on May 16, 2012, all of which are hereby expressly incorporated by reference into the present application.

TECHNICAL FIELD

The present invention relates to a bead apex rubber forming method and a bead apex rubber-forming device capable of forming accurately bead apex rubber on an outer circumferential surface of a bead core.

BACKGROUND ART

Figure 11A:
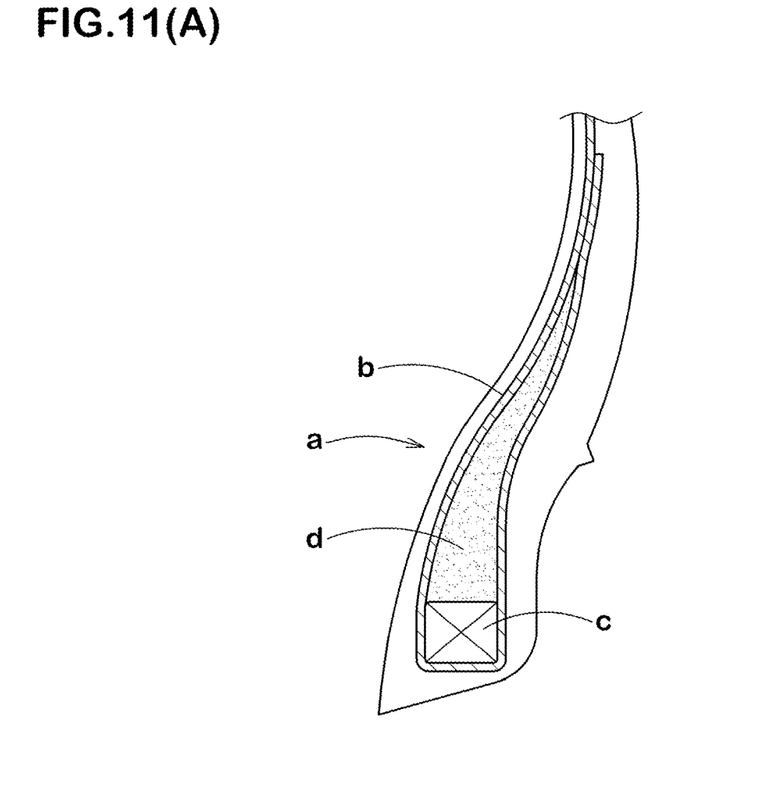
FIG. 11(A) is a cross-sectional view of a bead portion of a tire.

As shown in FIG. 11(A) schematically, a bead portion (a) of a pneumatic tire is provided with an annular bead core (c) made of a hard steel wire and the like to fix both ends of the carcass (b) securely and to prevent from dropping-off of a rim. The radially outer circumferential surface of the bead core (c) is provided with bead apex rubber (d) having a triangle shape in cross-section to improve bead durability and steering stability and the like. This bead apex rubber (d) is gone into a tire manufacturing line as a bead apex rubber-core joint body jointed integrally with the bead core (c) in advance (hereinafter called a "core joint body").

Figure 11B:
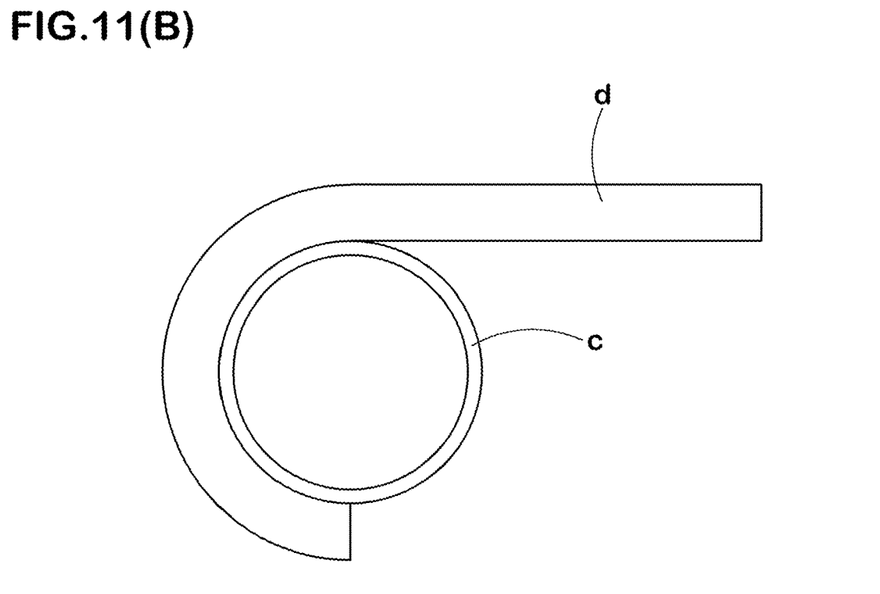
FIG. 11(B) is a side view of a conventional forming method of a bead apex rubber.

As the forming method of the core joint body, heretofore, as shown in FIG. 11(B), the bead apex rubber (d) having the triangle shape in cross-section extruded and formed with a rubber extruder is wrapped once on the outer circumferential surface of the bead core (c). Then both wrapping ends of tip portion and back-end portion are butted and jointed. At this time, the bead apex rubber (d) having a high temperature just after molding is soft and deformable. Therefore, to feed the bead apex rubber (d) just after molding to the bead core is not easy. It needs to once cool down after molding.

Figure 12A:
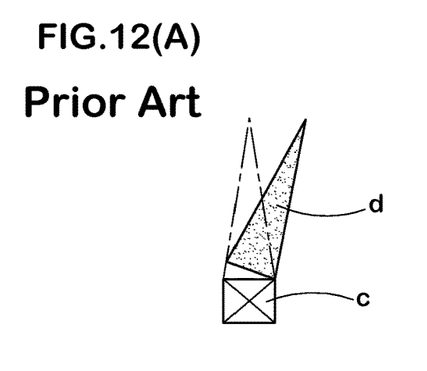
FIGS. 12(A)-12(E) are drawings showing some problems of the conventional bead apex rubber forming method.
Figure 12B:
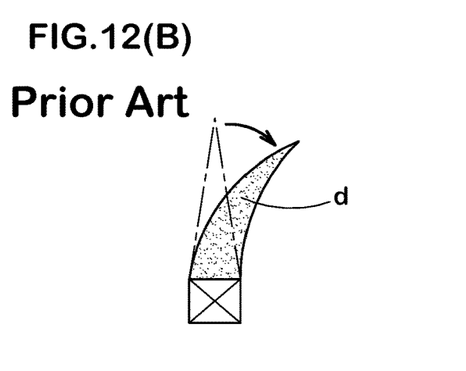
Figure 12C:
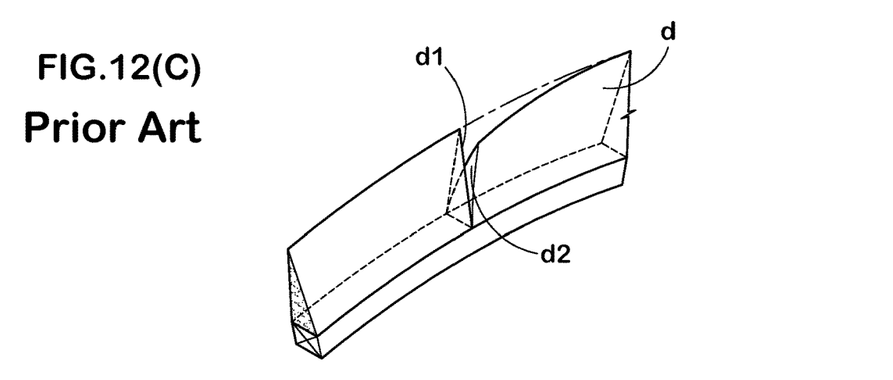
Figure 12D:
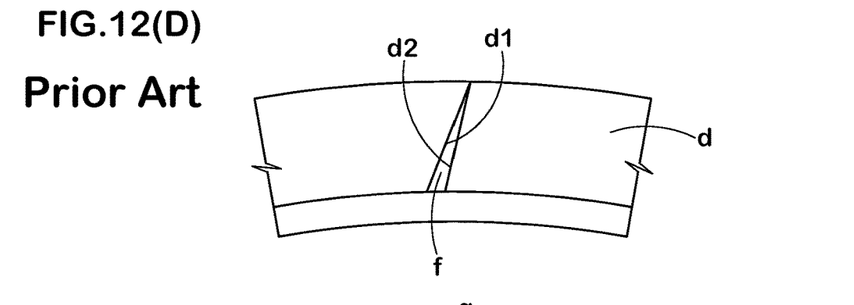
Figure 12E:
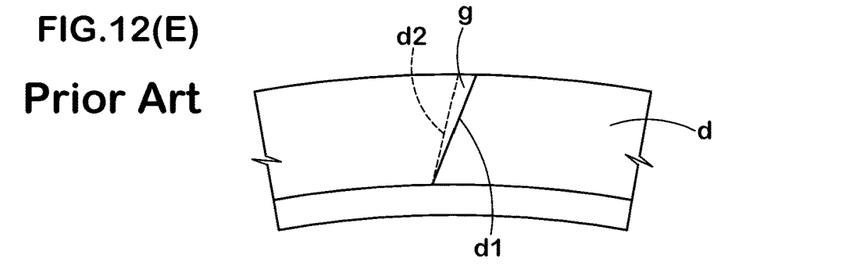

However, the cooling deteriorates adherence property of the bead apex rubber (d). In consequence, the lack of adhesion makes it easier to fall away the bead apex rubber (d) from the bead core (c) (see FIG. 12(A)). The cross-sectional shape deforms such as shrinking and curling of the bead apex rubber (d) in the width direction (see FIG. 12(B)). In the event of the severe curl, a tip portion (d1) and a back-end portion (d2) cannot be jointed. When the cross-sectional height of the bead apex rubber (d) is large, the bead apex rubber (d) falls due to the curl and it makes difficult to form the core joint body. Also there is problems that the joint portion drops off between the tip portion (d1) and the back-end portion (d2) owing to adhesion insufficiency (see FIG. 12(C)), and a gap (f) between the tip portion (d1) and the back-end portion (d2) (see FIG. 12(D)) and overlapping (g) between the tip portion (d1) and the back-end portion (d2) (see FIG. 12(E)) causes weight unbalance.

As a conventional device of the bead apex rubber to the bead core is known as the following Patent Documents 1 and 2.

BACKGROUND OF THE INVENTION

Patent Documents

Patent Document 1: Japanese Unexamined Patent Application Publication No. H10-291261
Patent Document 1: Japanese unexamined Patent Application Publication No. 2004-202960

GENERAL DESCRIPTION OF THE INVENTION

Problems to be Resolved by the Invention

It is an object of the present invention to provide the bead apex rubber forming method and a bead apex rubber-forming device capable of keeping a high adhesion strength between the bead apex rubber and the bead core, and of preventing the deformation caused by the shrinking; moreover, the bead apex rubber is substantially formed in a joint-less form, the problems of the weight unbalance caused by the occurrence of the gap and overlapping in the joint portion and the adhesion dropping-off in joint portion can be prevented.

Means of Solving the Problems

In the invention according to claim 1, a bead apex rubber forming method forms the bead apex rubber continuously in a full circle on an outer circumferential surface of the annular bead core having a core axis, the method comprises a molding process to form the bead apex rubber integrally on the outer circumferential surface of the bead core rotating around the core axis by flowing unvulcanized rubber from a rubber inflow port positioned in a first inner wall surface of a molding head into a bead apex molding chamber. The bead apex molding chamber is surrounded by the outer circumferential surface of the bead core, a first inner wall surface of the molding head on one side of the core axis direction, and a second inner wall surface of the molding head on the other side of the core axis direction. The bead apex molding chamber extends in the circumferential direction, and of which circumferential both ends are opened. The molding process comprises a tip forming step, a middle section forming step and a joining step. The tip forming step forms a tip portion of the bead apex rubber between front and rear shutters by flowing the unvulcanized rubber into the bead apex molding chamber, in a closed state that the bead apex molding chamber is closed by the front and rear shutters on the front and rear sides in the bead core rotating direction in relation to the rubber inflow port, and in a rotating stopped state of the bead core. The middle section forming step forms serially the bead apex rubber to be continuous with the tip portion by taking off the front shutter to open the front side in the bead core rotational direction and flowing the unvulcanized rubber while rotating the bead core. The joining step joints integrally the back-end portion and the tip portion by a rubber connecting portion. In the joining step, the bead core is stopped when the tip portion returns again to the bead apex molding chamber, the rear shutter is taken off to open the rear side in the bead core rotational direction and to form a connecting space between the back-end portion and the tip portion of the bead apex rubber, and the unvulcanized rubber is flowed into the connecting space to form the rubber connecting portion.

In the invention according to claim 2, a bead apex rubber forming device forms the bead apex rubber continuously in a full circle on an outer circumferential surface of the annular bead core having a core axis. The bead apex rubber forming device comprises a bead core holding means for holding the bead core rotatably around the core axis, a rubber extruder having a gear pump for extruding the unvulcanized rubber from a rubber discharge port depending on an on-off action of the gear pump, and a molding head fixed to the anterior end of the rubber extruder. The molding head comprises a passing space where a part of the rotating bead core passes. The passing space comprises a bead apex molding chamber surrounded by the outer circumferential surface of the bead core passing the passing space, a first inner wall surface of the molding head on one side of the core axis direction, and a second inner wall surface of the molding head on the other side of the core axis direction. The bead apex molding chamber extends in the circumferential direction, and of which circumferential both ends are opened. The first inner wall surface is provided with a rubber inflow port connected with the rubber discharge port via a rubber flow channel to flow the unvulcanized rubber from the rubber extruder into the bead apex molding chamber. The molding head comprises the front shutter, the rear shutter and a cutter. The front shutter closes the bead apex molding chamber on the front side in the bead core rotational direction in relation to the rubber inflow port. The rear shutter closes the bead apex molding chamber on the rear side in the bead core rotational direction in relation to the rubber inflow port. The cutter cuts the rubber portion in the rubber flow channel from the rubber portion in the bead apex molding chamber by crossing the rubber inflow port along the first inner wall surface.

Effect of the Invention

A bead apex rubber forming method comprises a molding process to form a bead apex rubber, by flowing unvulcanized rubber into a bead apex molding chamber, directly on an outer circumferential surface of a bead core rotating around a core axis. This molding process comprises a tip forming step to form a tip portion of the bead apex rubber, a middle section forming step to form serially the bead apex rubber to be continuous with the tip portion, and a joining step to joint a back-end portion and the tip portion by flowing unvulcanized rubber.

In the tip forming step, front and rear shutters close the bead apex molding chamber on the front side and rear side in the bead core rotational direction in related to the rubber inflow port. And, in a rotating stopped state of the bead core, the unvulcanized rubber is flowed into the closed bead apex molding chamber so as to form the tip portion of the bead apex rubber.

Firstly, in the tip forming step, since the bead apex molding chamber is in the closed state, the rubber inner pressure can be heightened in the molding chamber. Therefore, owing to the rubber filled up in the molding chamber, the tip portion can be accurately made. Since the rubber inner pressure is high, the sticking force between the tip portion and the bead core is heightened, adhesion strength can be improved.

Secondly, in the middle section forming step, in a state that the front side in the bead core rotational direction is opened by taking off the front shutter, the unvulcanized rubber flows while the bead core rotating. This makes the bead apex rubber serially to be continuous with the tip portion.

In the bead apex molding chamber, since the tip portion has already been formed, when also the front shutter is taken off, the bead apex molding chamber is substantially in the closed state. Therefore, the rubber flowed from the rubber inflow port pushes the rubber molding portion, which has already molded in the bead apex molding chamber, toward the front side in the bead core rotational direction, and connecting with the rubber molding portion. At this time, the bead core can integrally rotates with the rubber molding portion owing to the pushing force by the rubber toward the front side in the bead core rotational direction.

Finally, in the joining step, the bead core rotates substantially once, and the tip portion come back to the bead apex molding chamber, the bead core is stopped, and the rear shutter is removed to open the rear side in the bead core rotational direction. This forms a connecting space between a back-end portion and the tip portion of the bead apex rubber. And in the connecting space, the unvulcanized rubber is flowed more. This allows integrally connect the back-end portion and the tip portion by the rubber connecting portion.

As seen from the above, the space between the tip portion and the back-end portion is filled with the flowed unvulcanized rubber and connected in the same cross-section shape, and the bead apex rubber gets to have a substantially joint-less structure. Therefore, the conventional gap and overlapping attributed to a joint do not occur, weight dispersion is inhibited, and adhesive separation in the joint portion can be prevented.

Furthermore, the bead apex rubber is formed in a circular form in holding a high-temperature state. Thus, the shrinking and a deformation attributed to the shrinking can be inhibited by constriction in whole. And, since the bead apex rubber is integrally formed with the bead core, the bead apex rubber and the bead core can keep high adhesion strength.

And, it eliminates the need for a conventional cooling process and a pasting process. Therefore, this can make a contribution by reducing number of processes, improving production efficiency, reducing factory space, and downsizing a manufacturing line and an apparatus.

MODE FOR CARRYING OUT THE INVENTION

Figure 1:
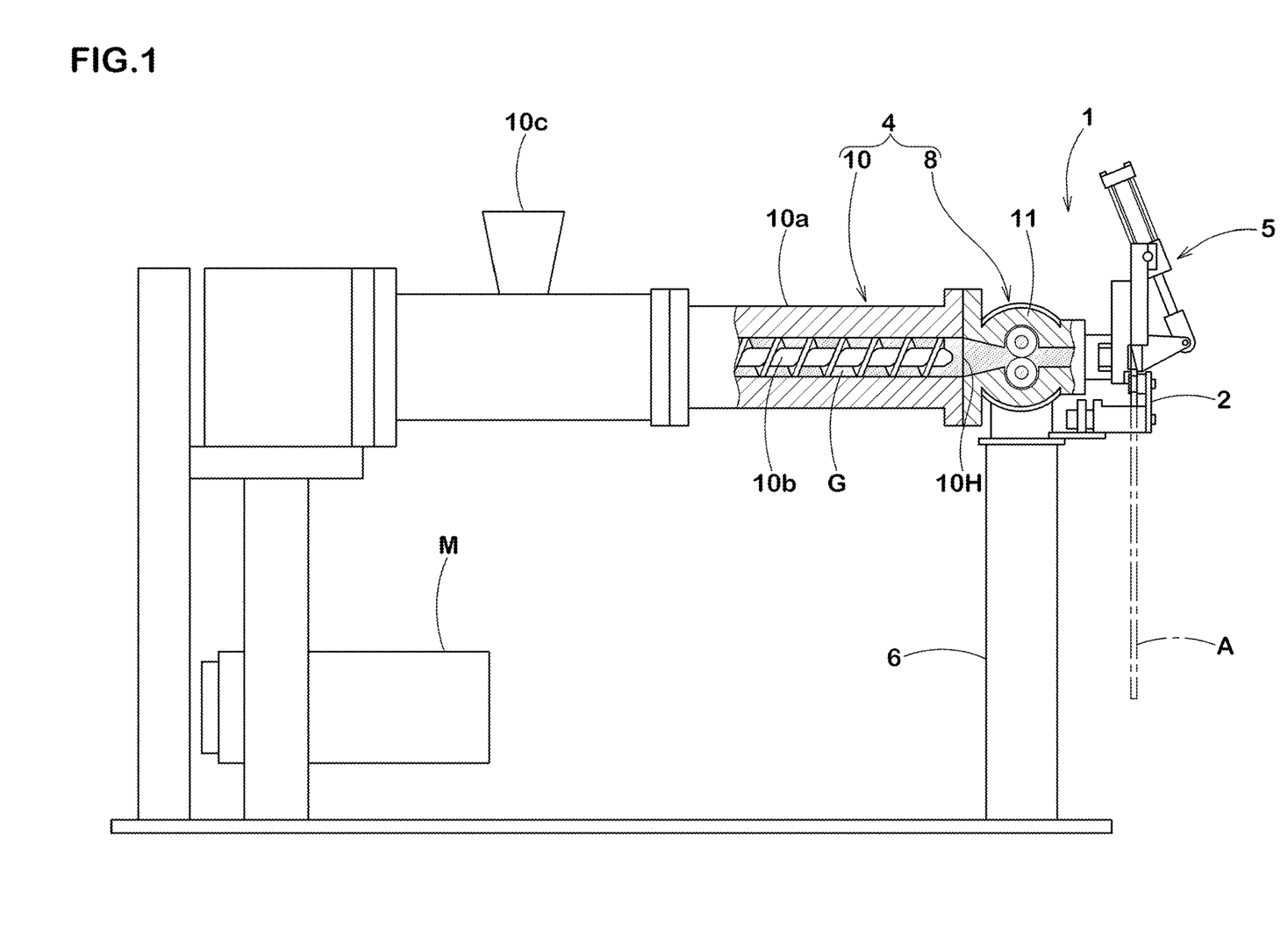
FIG. 1 is a side view showing an embodiment of a bead apex rubber forming device for a bead apex rubber forming method of the present invention.

Hereinafter, preferred embodiments of the present invention will be concretely described. FIG. 1 is a side view showing an embodiment of a bead apex rubber forming device 1 (may be simply called "forming device 1").

Figure 3:
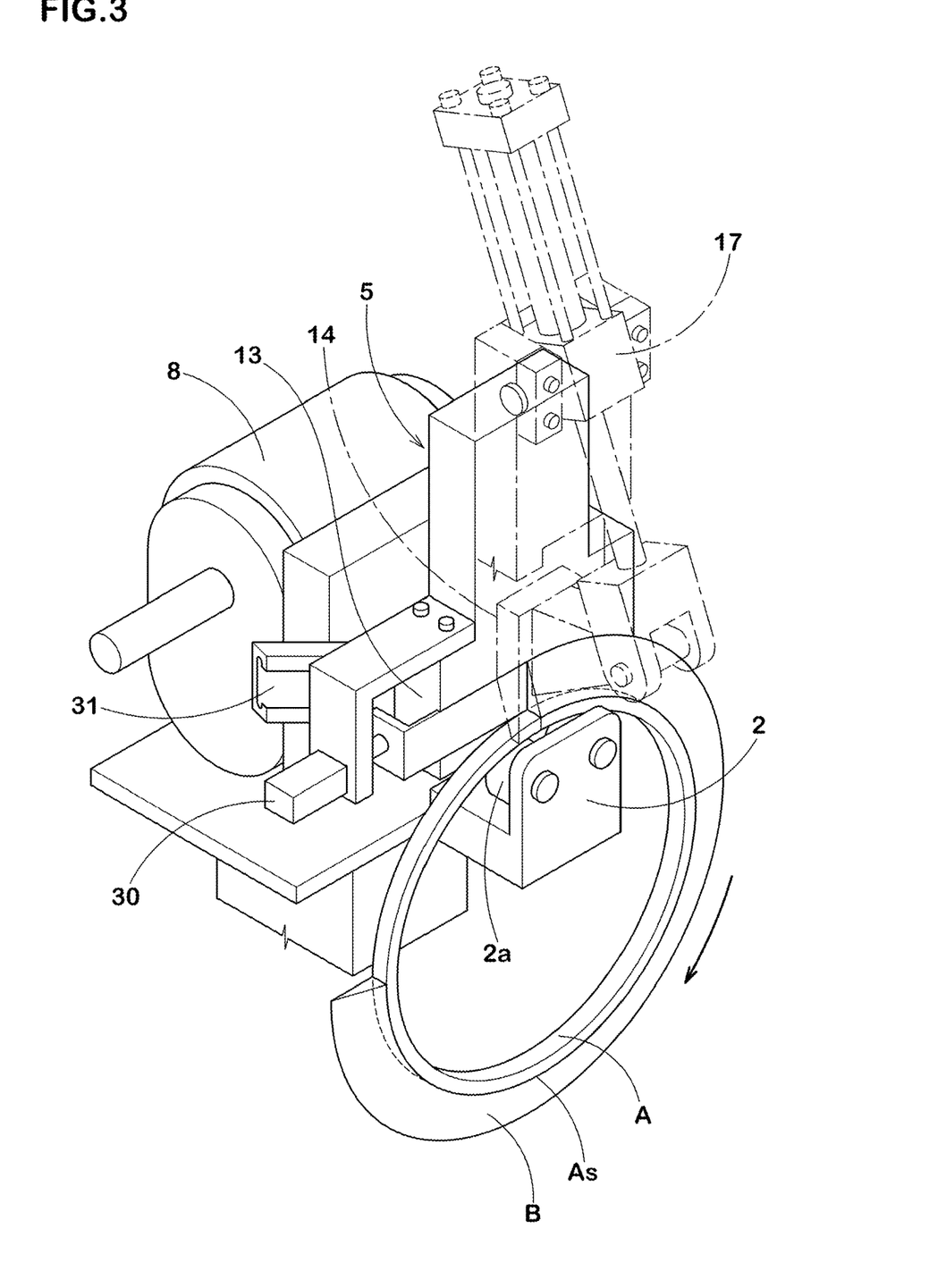
FIG. 3 is a perspective view of the major portion of the bead apex rubber forming device.

As shown in FIG. 1, the forming device 1 comprises a bead core holding means 2 for holding rotatably an annular bead core A around a core axis, a rubber extruder 4 extruding unvulcanized rubber G from a rubber discharge port 3, and a molding head 5 fixed to a anterior end of the rubber extruder 4. As shown in FIG. 3, the forming device 1 forms a bead apex rubber B in a full circle on the outer circumferential surface of the bead core A.

Figure 5:
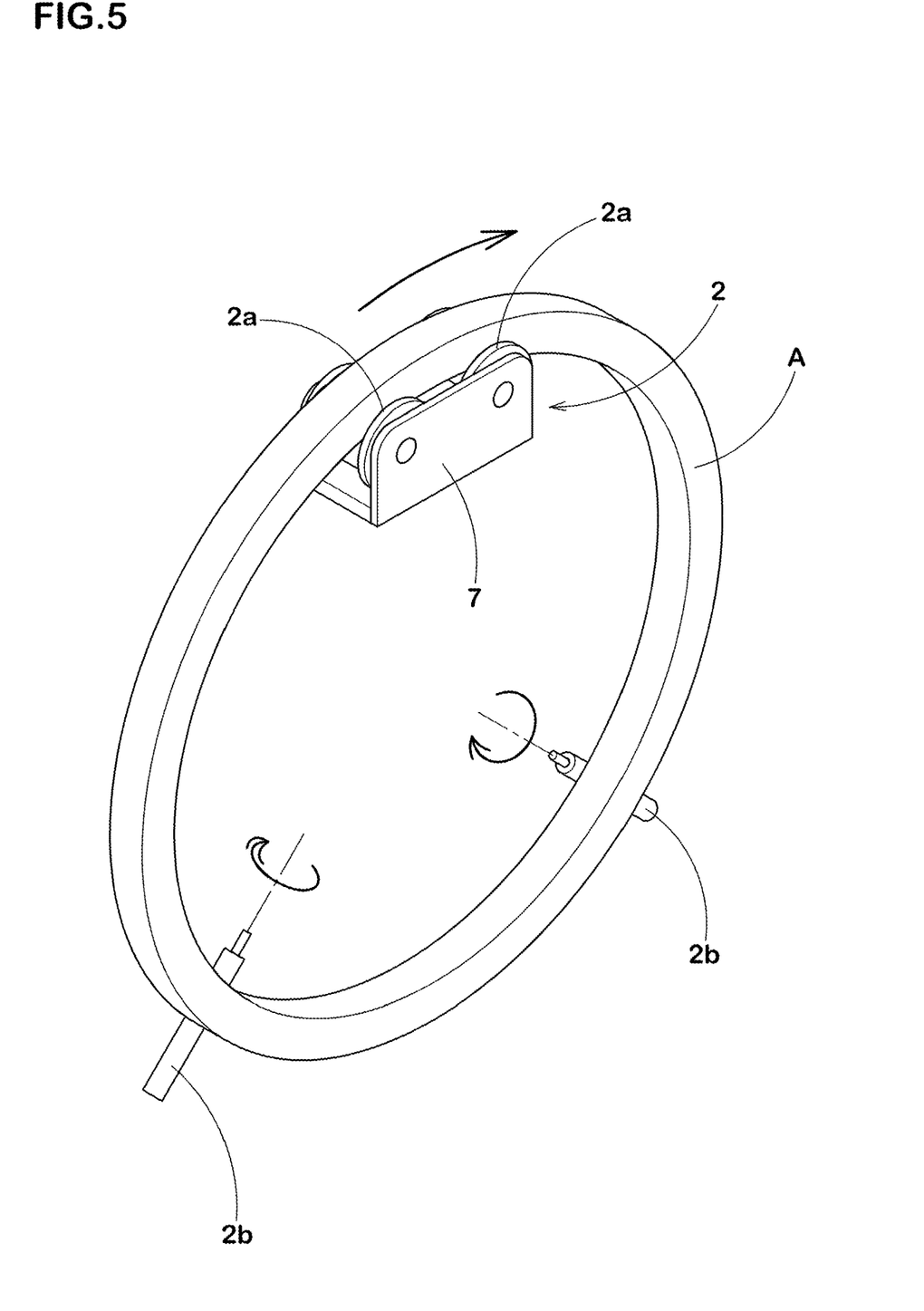
FIG. 5 is a perspective view showing a bead core holding means.

In the present embodiment, as shown in FIG. 5, the bead core holding means 2 comprises a pair of parallel holding rollers 2a, 2a to hold an inner periphery of the bead core A. The holding rollers 2a, 2a is rotatably mounted on a supporting platform 6 (shown in FIGS. 1 and 2) holding the molding head 5 via a roller holder 7. The bead core A is rotatably held around the horizontal core axis in suspending and straddled state between the holding rollers 2a, 2a. The bead core holding means 2 of the present embodiment comprises plural of side rollers 2b to keep a posture stability of the bead core A by holding a side surface of the bead core A.

The rubber extruder 4 is provided in the anterior end portion with a gear pump 8, and extrudes the unvulcanized rubber G from a rubber discharge port 9 (shown in FIG. 4) depending on an on-off action of the gear pump 8. Specifically, the rubber extruder 4 of the present embodiment comprises a rubber extruder main body 10 pushing the input rubber G toward a opening 10H of the anterior end while kneading, and the gear pump 8 provided with the anterior end portion of the rubber extruder main body 10. The rubber extruder main body 10 has a well-known structure comprising a cylinder 10a comprising the rubber slot 10c and a screw shaft 10b disposed in the cylinder 10a. Owing to the rotation of the screw shaft 10b by the electric motor M, the rubber G is extruded with kneading from the opening 10H of the anterior end of cylinder 10a.

Figure 2:
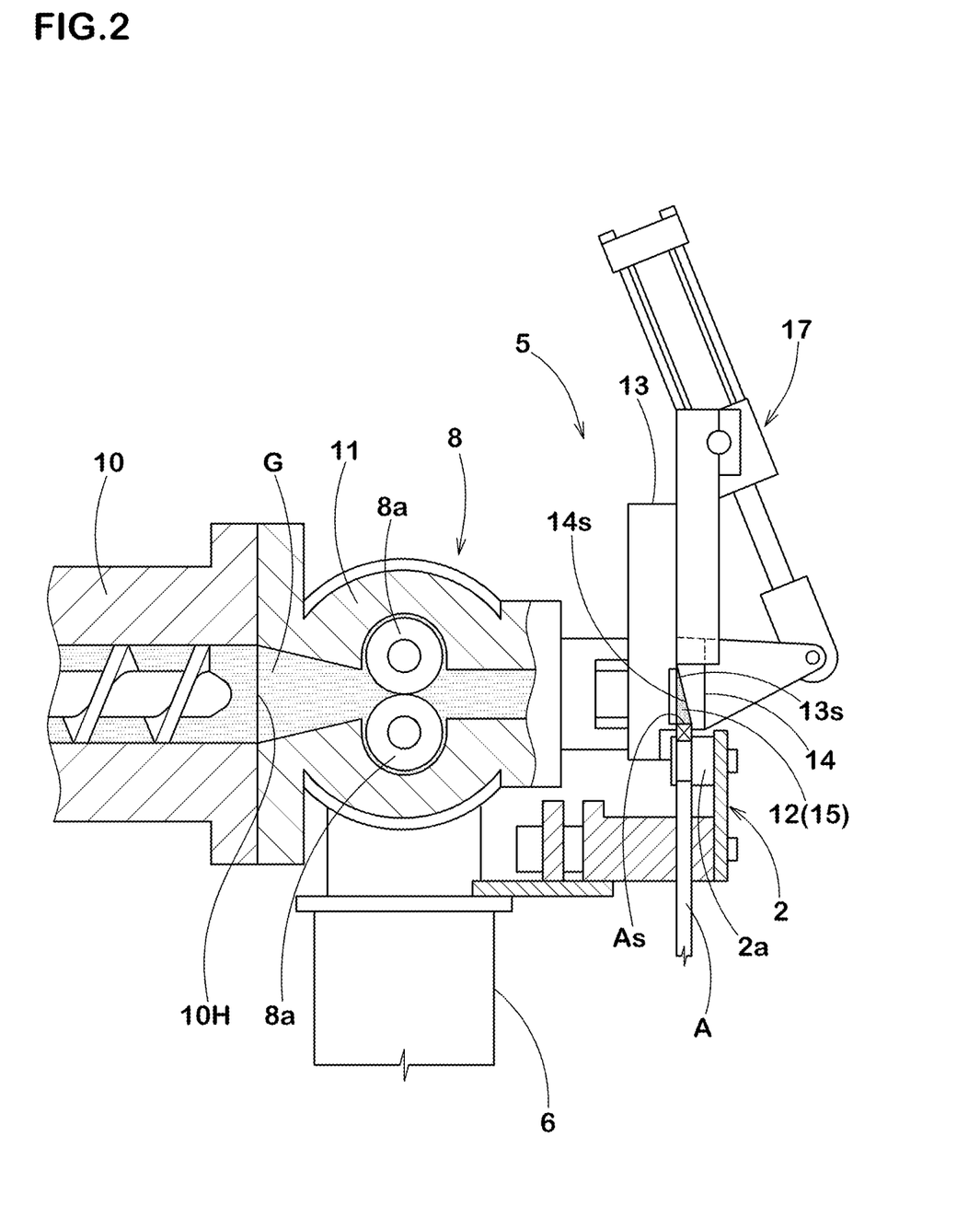
FIG. 2 is a side enlarged view of a major portion of the bead apex rubber forming device.

As shown in FIG. 2, the gear pump 8 is a well-known isovolumic extruder. The gear pump 8 comprises a case 11 and a pair of extrusion gears 8a disposed in the case 11. The extrusion gears 8a rotate in engaging one another with an electric motor (not shown). And the rubber G extruded from the rubber extruder main body 10 is pushed from the rubber discharge port 9 (shown in FIG. 4) of the anterior end. The case 11 of the present embodiment is attached to the anterior end of the rubber extruder main body 10 and supported from underneath by the supporting platform 6.

Figure 6A:
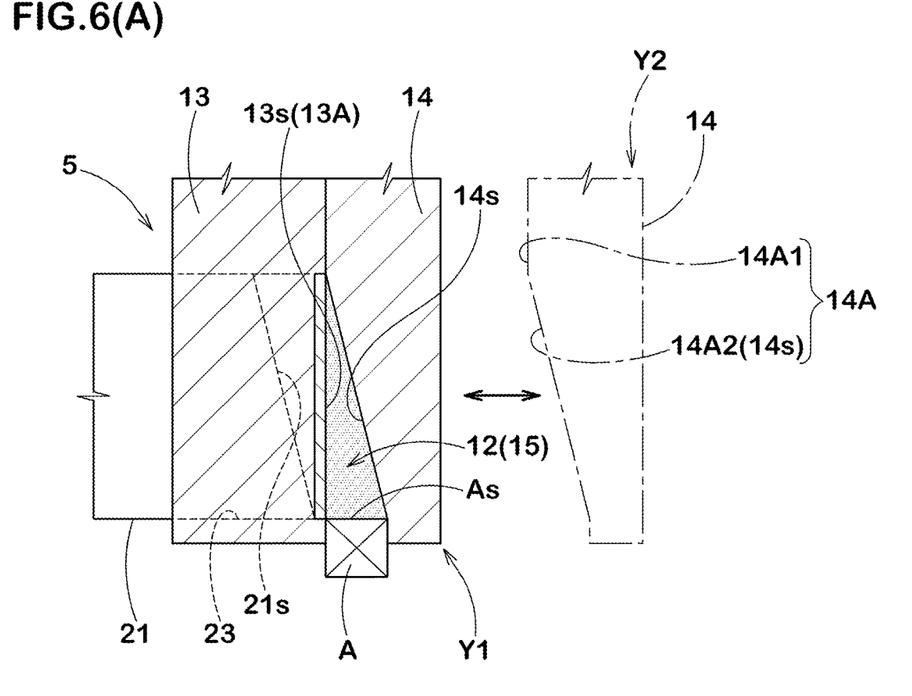
FIG. 6(A) is a cross-sectional view of a bead apex molding chamber in the core axis direction.
Figure 6B:
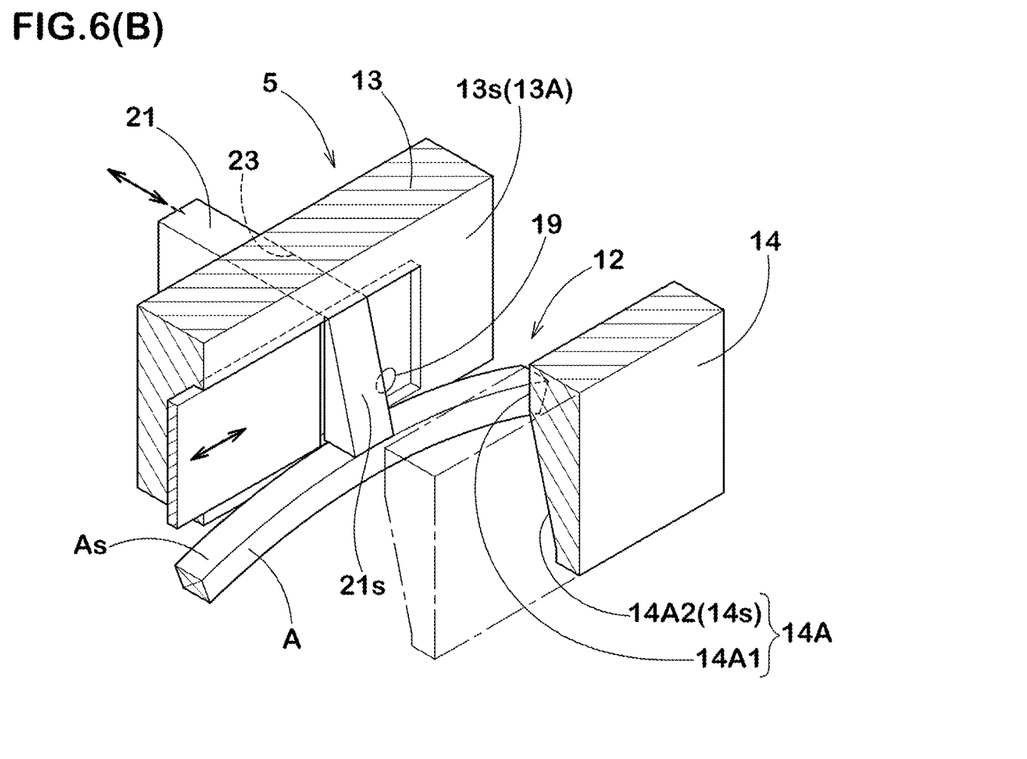
FIG. 6(B) is an exploded perspective view thereof.

As shown FIGS. 2, 6(A), and 6(B), the molding head 5 comprises a passing space 12 where a part of the rotating bead core A passes in the circumferential direction. The passing space 12 comprises a bead apex molding chamber 15 (may be simply called "molding chamber 15") having a triangle-shaped in cross-sectional view. The molding chamber 15 is surrounded by the outer circumferential surface As of the bead core A passing through the passing space 12, a first inner wall surface 13s of the molding head 5 on one side of the core axis direction, and a second inner wall surface 14s of the molding head 5 on the other side. The molding chamber 15 extends in the circumferential direction, and the both end portions thereof are open.

Specifically, the molding head 5 of the present embodiment comprises a head main body 13 fixed on the side of the gear pump 8, and a cover plate 14 kept on the head main body 13 with a holding means 17. An exterior surface 13A of the head main body 13 forms the first inner wall surface 13s of the molding chamber 15. An internal face 14A of the cover plate 14 forms the second inner wall surface 14s of the molding chamber 15. Technically, the internal face 14A of the cover plate 14 of the present embodiment comprises a contacting surface 14A1 positioned on the exterior surface 13A of the head main body 13, and a sloping surface 14A2 continuing into the contacting surface 14A1. And the sloping surface 14A2 forms the second inner wall surface 14s. The cover plate 14 can change its positions between a closed state Y1 for forming the molding chamber 15 and an opened state Y2 for opening the molding chamber 15 by the holding means 17 such as using cylinder. In the opened state Y2, a takeoff of the core assembled body from the molding chamber 15 and a mounting of a next bead core A onto the molding chamber 15 are conducted.

Figure 4:
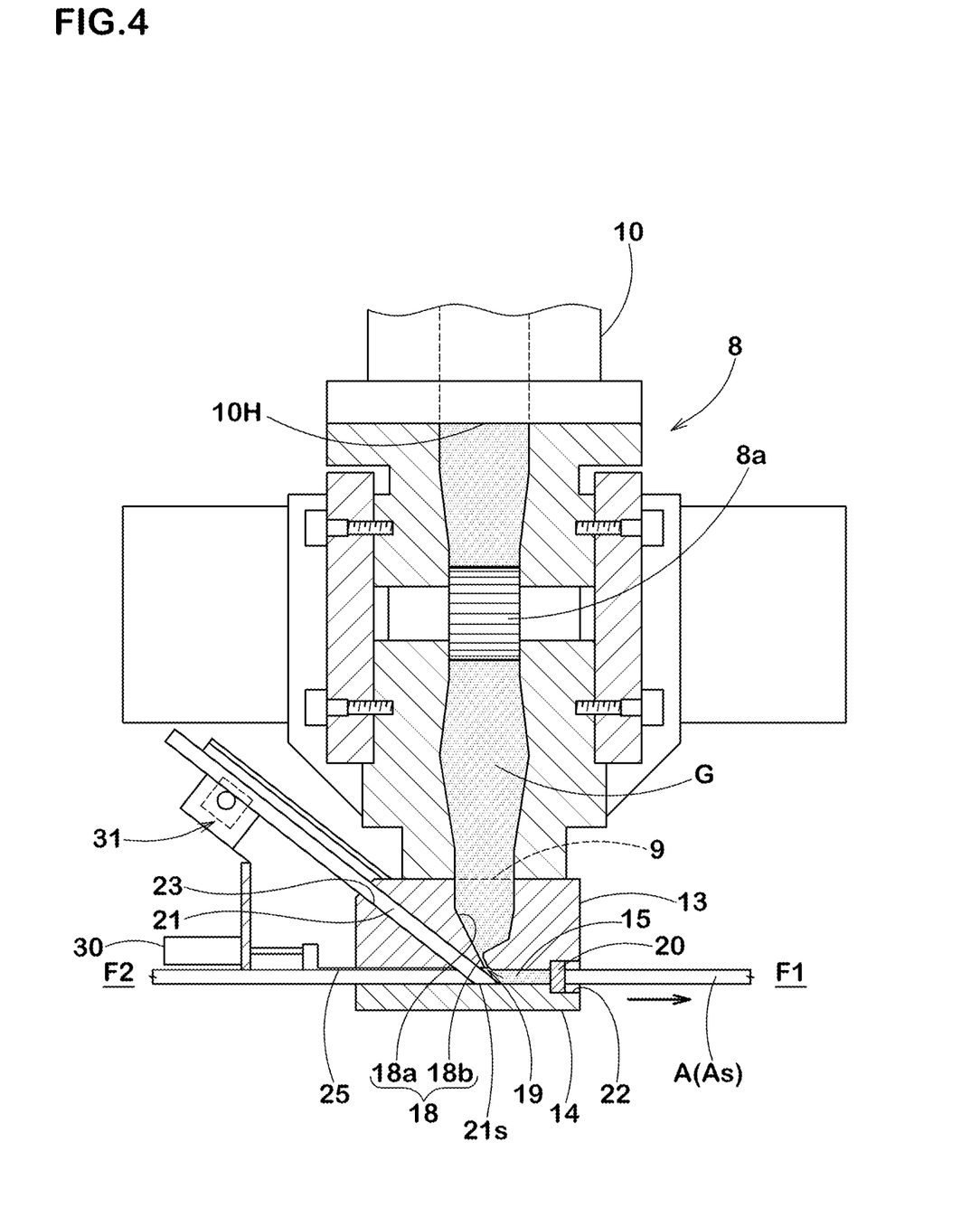
FIG. 4 is a cross-sectional overhead view of the major portion of the bead apex rubber forming device.
Figure 8:
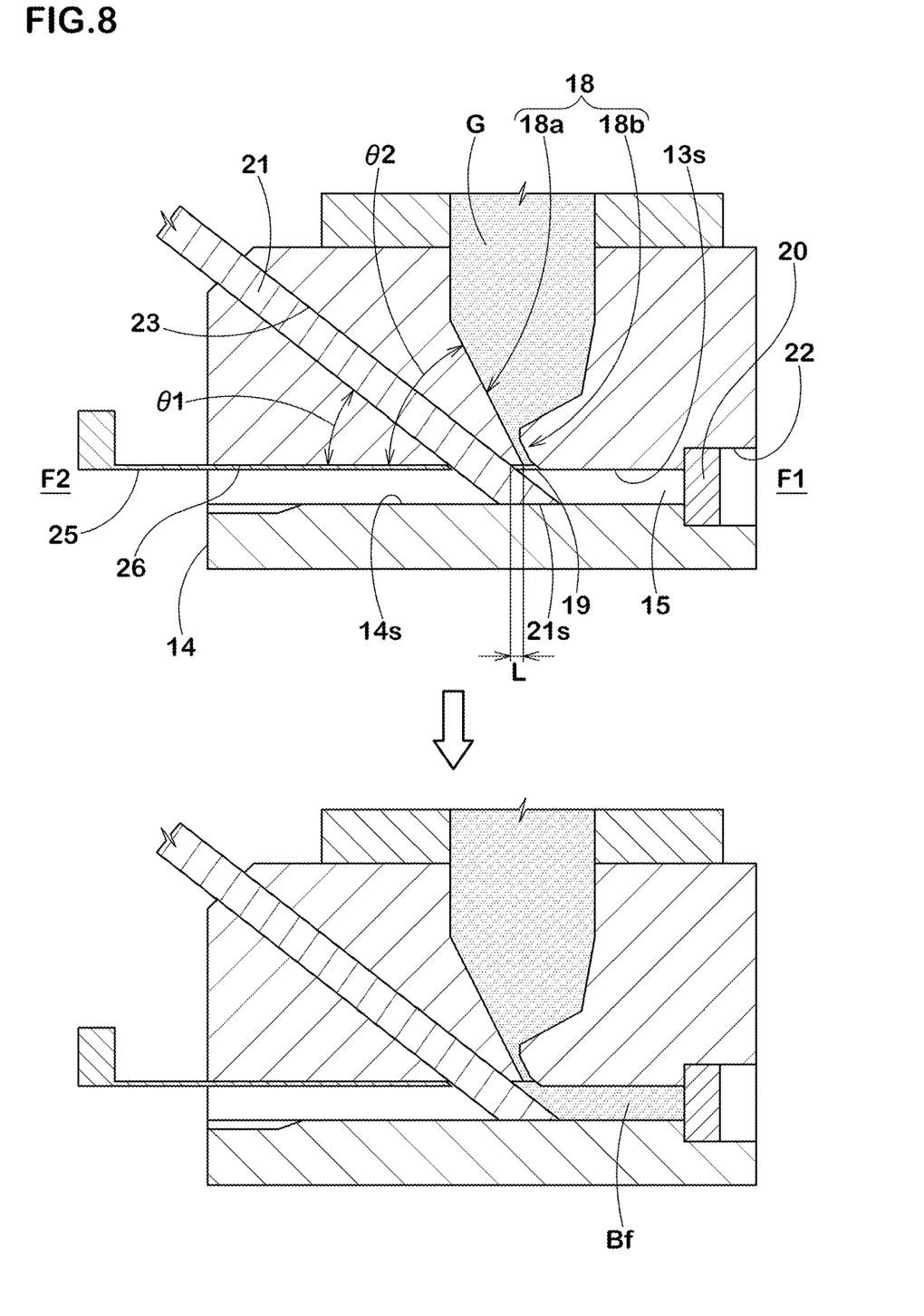
FIG. 8 is a cross-sectional overhead view explaining a tip forming step.

In the first inner wall surface 13s of the molding head 5, a rubber inflow port 19 opens. As shown in FIGS. 4 and 8, the rubber inflow port 19 continues into the rubber discharge port 9 via a rubber flow channel 18 and let flow the rubber G input from the rubber extruder 4 into the molding chamber 15. The rubber flow channel 18 comprises a tapered squeezing channel 18a having a cross-sectional area gradually reduced toward the front, and a parallel channel 18b extending from the squeezing channel 18a to the rubber inflow port 19 and having a substantially constant cross-sectional area. The parallel channel 18b inclines to the front side F1 in the bead core rotational direction.

The molding head 5 comprises a front shutter 20 to close the molding chamber 15 on the front side F1 in the bead core rotational direction in relation to the rubber inflow port 19, a rear shutter 21 to close the molding chamber 15 on the rear side F2 in the bead core rotational direction in relation to the rubber inflow port 19. In the present embodiment, in a circumferential front of the molding head 5, a guiding grove 22 extends up and down. The front shutter 20 is movable up and down along the guiding groove 22. Therefore the molding chamber 15 can be opened and closed the front side F1 in the bead core rotational direction in relation to the rubber inflow port 19.

The head main body 13 comprises a guiding groove 23 extending at an angle toward the front side F1 in the bead core rotational direction and intersecting with the molding chamber 15. The rear shutter 21 is movable back and forth along the guiding groove 23. In a forward movement, the rear shutter 21 traverses the molding chamber 15, and its anterior end surface 21s thickly contacts with the second inner wall surface 14s. Thus the rear shutter 21 can close the molding chamber 15 the rear side F2 in the bead core rotational direction in relation to the rubber inflow port 19. In the posterior movement of the rear shutter 21, the molding chamber 15 is opened. It is preferable to open-and-close the rear shutter 21 at a position near the rubber inflow port 19 in a joining step described below for letting flow the unvulcanized rubber G into a connecting space j. Therefore, a distance L (shown in FIG. 8) between the guiding groove 23 and the rubber inflow port 19 is set to be not more than 1 mm. For the same purpose, an angle θ1 of the guiding groove 23 with respect to the circumferential direction is also preferably set to be smaller than an angle θ2 of the parallel channel 18b with respect to the circumferential direction.

The molding head 5 comprises a cutter 25. The cutter 25 cuts across the rubber inflow port 19 along the first inner wall surface 13s. And the cutter 25 cuts off the rubber in the rubber flow channel 18 from the rubber in the molding chamber 15. The cutter 25 of the present embodiment can move back and forth along the guiding groove 26 formed in the first inner wall surface 13s. The rubber inflow port 19 opens in a bottom face of the guiding groove 26. Meanwhile an item 30 shown in FIG. 4 indicates a driving means for driving the cutter 25, and a cylinder is employed in the present embodiment. An item 31 indicates a driving means of the rear shutter 21, and a gear-rack structure is employed in the present embodiment. The front shutter 20 is derived by a driving means (not shown) such as the cylinder.

Next, a bead apex rubber forming method (may be simply called "forming method") will be explained with the forming device 1.

Figure 7:
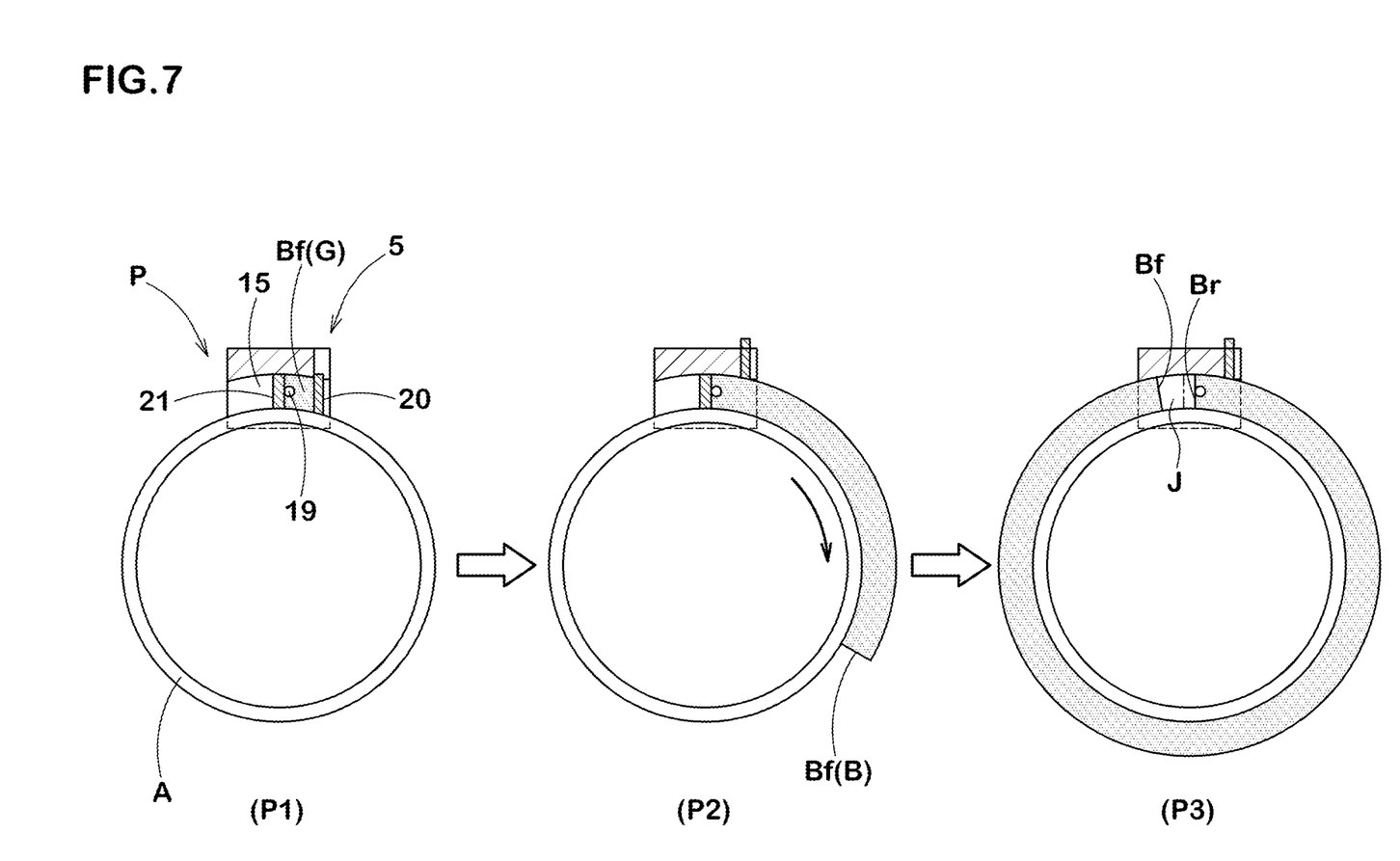
FIG. 7 is a front view conceptually showing a molding process.

As shown in FIG. 7, the forming method of the present embodiment comprises a molding process P to form the bead apex rubber B integrally on an outer circumferential surface As of a rotating bead core A by letting flow the unvulcanized rubber G from the rubber inflow port 19 into the molding chamber 15.

The molding process P, as shown in FIG. 7, comprises a tip forming step P1 to form a tip portion Bf of the bead apex rubber B, a middle section forming step P2 to form serially the bead apex rubber B so as to be continuous with the tip portion Bf, and a joining step P3 to connect integrally the back-end portion Br with the tip portion Bf by flowing the unvulcanized rubber in the connecting space J between the back-end portion Br and the tip portion Bf.

Figure 9:
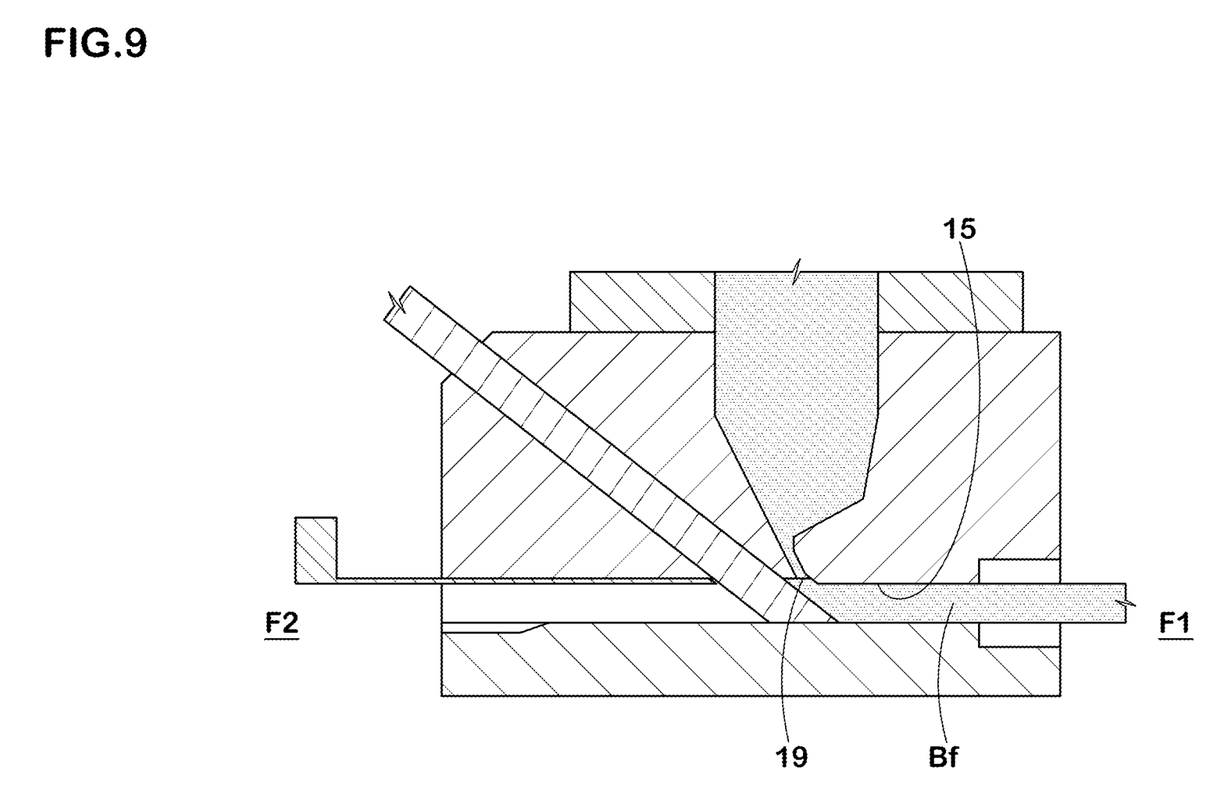
FIG. 9 is a cross-sectional overhead view explaining a middle section forming step.

FIGS. 8 to 10 are overhead views of the molding chamber 15, the bead core A is abbreviated for convenience sake. As shown in FIG. 8, in the tip forming step P1, the front and rear shutters 20, 21 close the molding chamber 15 on the front side F1 and the rear side F2 in the bead core rotational direction in relation to the rubber inflow port 19. In a rotating stopped state of the bead core A, the molding chamber 15 in the closed state is filled with the poured unvulcanized rubber G. Thus the tip portion Bf of the bead apex rubber B is formed between the front and rear shutters 20, 21.

In this time, the molding chamber 15 gets into the closed state by the front and rear shutters 20, 21, a rubber inner pressure can be raised in the molding chamber 15. In consequence, the tip portion Bf can be formed accurately. And since the rubber inner pressure is high, the sticking force between the tip portion Bf and the bead core A is heightened, and the adhesion strength can be improved. Meanwhile, the inflow-and-stop and the volume of flow of the rubber G is controlled with the on-and-off of the gear pump 8.

As shown in FIG. 9, in the middle section forming step P2, the front shutter 20 is taken off, and the front side F1 in the bead core rotational direction is opened, and the unvulcanized rubber G is flowed from the rubber inflow port 19 while rotating the bead core A. This connects with the tip portion Bf to form the bead apex rubber B serially.

In the molding chamber 15, since the tip portion Bf has already been formed, even if the front shutter 20 is taken off, the molding chamber 15 is substantially in the closed state. Therefore, the rubber G flowed from the rubber inflow port 19 pushes the rubber molding portion, which has been already formed in the molding chamber 15, toward the front side F1 in the bead core rotational direction and connects with the rubber molding portion to form the bead apex rubber B serially. At this time, the bead core A can integrally rotates with the rubber molding portion owing to the pushing force by the rubber G toward the front side F1 in the bead core rotational direction. That is to say, the forming device 1 of the present embodiment needs no motor and the like to drive the bead core A, but the pushing force of the rubber G rotates automatically. Therefore, the structure of the bead core holding means 2 can be simplified.

Figure 10A:
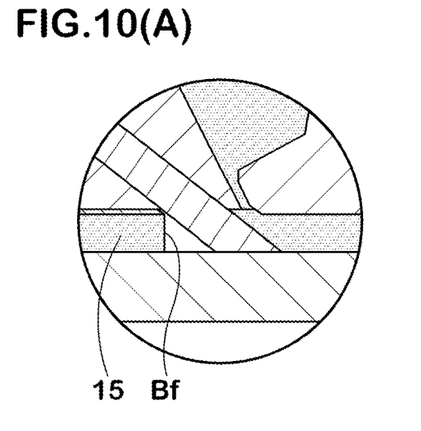
FIGS. 10(A)-10(E) are cross-sectional overhead views explaining a joining step.
Figure 10B:
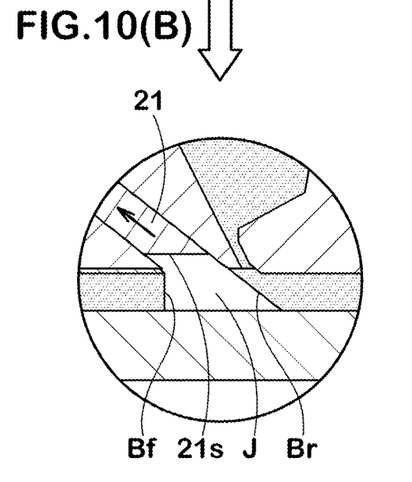
Figure 10C:
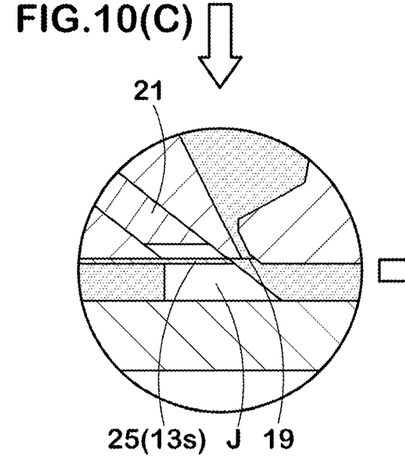
Figure 10D:
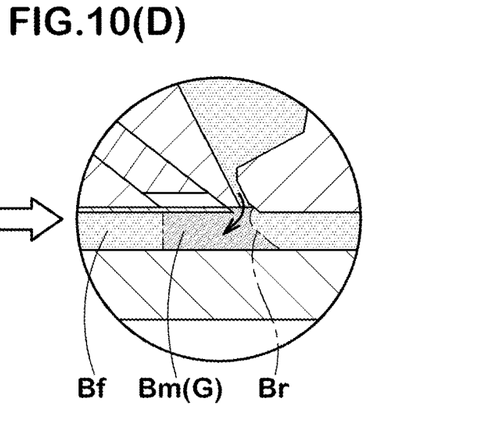

In the joining step P3, when the bead core A substantially goes around and the tip portion Bf comes back to the molding chamber 15, the rotation of the bead core A gets stopped (FIG. 10(A)). This stopping can be conducted with the stop of flowing of the rubber G from the rubber inflow port 19 by the gear pump 8. And, supplementary, brake means can be employed. Subsequently, the rear shutter 21 sets back to open the rear side F2 in the bead core rotational direction (FIG. 10(B)). This forms a connecting space J between the back-end portion Br and the tip portion Bf of the bead apex rubber B. In the present embodiment, since a backward amount of the rear shutter 21 is large, the cutter 25 is carried forward the position of the back-end portion Br so as to the cutter 25 forms a first inner wall surface 13s in the connecting space J (FIG. 10(C)). However, the first inner wall surface 13s in the connecting space J can be also made by carry backward the anterior end surface 21s of the rear shutter 21 to the same plane of the first inner wall surface 13s.

After forming the connecting space J, by putting the gear pump 8 into practice, the rubber G can be flowed into the connecting space J. The back-end portion Br and the tip portion Bf are integrally connected by the rubber connecting portion Bm (FIG. 10(D)). Since the rubber inflow port 19 is positioned near the rear shutter 21, and since the rear shutter 21 inclines toward the front side F1 in the bead core rotational direction, in the back-end portion Br, the connecting side with the rubber inflow port 19 takes the form of having an acute angle. Therefore, the rubber G from the rubber inflow port 19 can flow easily from the acute angle part into the connecting space J.

Figure 10E:
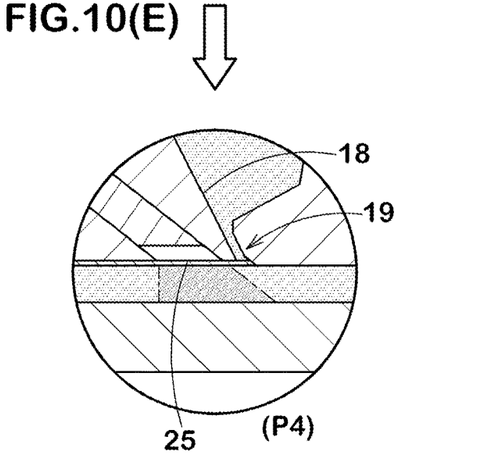

In the present embodiment, after forming the rubber connecting portion Bm, a cutoff step P4 is conducted (FIG. 10(E)). In the cutoff step P4, the cutter 25 carries forward to across the rubber inflow port 19 along the first inner wall surface 13s. In doing so, the bead apex rubber B is cut off from the rubber portion in the rubber flow channel 18. The rubber inflow port 19 has a small diameter. Therefore, the rubber can be cut off not using the cutter 25 but strain at the time of taking the core assembled body off from the molding chamber 15.

As presented above, in the molding process P, the tip portion Bf and the back-end portion Br can also connected in the same cross-sectional shape with the flow of the unvulcanized rubber. Thus, the bead apex rubber B is formed in a substantially joint-less form. Therefore, the conventional gap and overlapping attributed to a joint do not occur, the weight dispersion is inhibited, and adhesive separation in the joint portion can be prevented.

Although the especially preferred embodiments of the present invention have been described in detail, the invention is not limited to the above-mentioned specific embodiments, and various modifications can be made.

EXPLANATION OF THE REFERENCE

1 Bead apex rubber forming device
2 Bead core holding means
3 Rubber discharge port
4 Rubber extruder
5 Molding head 8 Gear pump
12 Passing space
13s First inner wall surface
14s Second inner wall surface
15 Bead apex molding chamber
18 Rubber flow channel
19 Rubber inflow port
20 Front shutter
21 Rear shutter
25 Cutter
A Bead core
As Outer circumferential surface
B Bead apex rubber
Bf Tip portion
Bm Rubber connecting portion
Br Back-end portion
G unvulcanized rubber
J connecting space
P Molding process
P1 Tip forming step
P2 Middle section forming step
P3 Joining step

The invention claimed is:

1. A bead apex rubber forming device to form the bead apex rubber continuously in a full circle on an outer circumferential surface of an annular bead core having a core axis, wherein the bead apex rubber forming device comprises a bead core holding means for holding the bead core rotatably around the core axis,
a rubber extruder having a gear pump for extruding unvulcanized rubber from a rubber discharge port depending on an on-off action of the gear pump, and
a molding head fixed to the rubber extruder,
the molding head comprises
a bead apex molding chamber being surrounded by the outer circumferential surface of the bead core,
a first inner wall surface of the molding head on one side of a core axis direction, and
a second inner wall surface of the molding head on another side of the core axis direction,
the first inner wall surface being provided with a rubber inflow port connected with the rubber discharge port via a rubber flow channel to feed the unvulcanized rubber from the rubber extruder to the bead apex molding chamber,
the bead apex molding chamber extending in a circumferential direction of the outer circumferential surface, and being openable and closable in the circumferential direction by front and rear shutters on a front portion and a rear portion respectively of the bead apex molding chamber in a bead core rotating direction in relation to the rubber inflow port,
the molding head further comprising
the front shutter,
the rear shutter positioned between a rear end of the bead apex molding chamber in the bead core rotating direction and the rubber inflow port so that a portion for entering a previously-extruded tip of the bead apex rubber is formed in the bead apex molding chamber and between the rear end of the bead apex molding chamber and the rear shutter, and
a cutter to cut the bead apex rubber off from the rubber in the rubber flow channel,
the cutter being slidable along a cutter-guiding groove formed on the first inner wall surface,
the rear shutter being slidable along a shutter-guiding groove of the molding head,
wherein
the rubber inflow port and the shutter-guiding groove are open in a bottom-surface of the cutter-guiding groove that is opposite to the bead apex molding chamber in a thickness direction of the cutter-guiding groove, and
the opening of the rubber inflow port and the opening of the shutter-guiding groove are arranged side by side in the circumferential direction.

2. The bead apex rubber forming device as set forth in claim 1, wherein the shutter-guiding groove is inclined at an angle toward a front end of the bead apex molding chamber in the bead core rotating direction.

3. The bead apex rubber forming device as set forth in claim 1, wherein a distance along the first inner wall surface between the opening of the shutter-guiding groove and the opening of the rubber inflow port is not more than 1 mm.

4. The bead apex rubber forming device as set forth in claim 1, wherein an angle of the shutter-guiding groove with respect to the circumferential direction is smaller than an angle of the rubber flow channel with respect to the circumferential direction.

* * * * *